United States Patent
Hashimoto et al.

(10) Patent No.: US 9,006,334 B2
(45) Date of Patent: Apr. 14, 2015

(54) MANUFACTURING METHOD OF COUMARONE-INDENE RESIN WATER-DISPERSED COMPOSITION AND WATER-DISPERSED COMPOSITION

(75) Inventors: Masayuki Hashimoto, Kyoto (JP); Asako Ogasawara, Kyoto (JP); Tadashi Kimura, Fukuoka (JP); Kimiko Izumi, Fukuoka (JP)

(73) Assignees: Dai-Ichi Kogyo Seiyaku Co., Ltd., Kyoto (JP); Nitto Chemical Co., Ltd., Tokyo (JP)

( * ) Notice: Subject to any disclaimer, the term of this patent is extended or adjusted under 35 U.S.C. 154(b) by 3 days.

(21) Appl. No.: 13/992,446

(22) PCT Filed: Nov. 7, 2011

(86) PCT No.: PCT/JP2011/006198
§ 371 (c)(1),
(2), (4) Date: Sep. 5, 2013

(87) PCT Pub. No.: WO2012/077277
PCT Pub. Date: Jun. 14, 2012

(65) Prior Publication Data
US 2013/0338277 A1 Dec. 19, 2013

(30) Foreign Application Priority Data
Dec. 9, 2010 (JP) .................................. 2010-274545

(51) Int. Cl.
| | | |
|---|---|---|
| C08L 37/00 | (2006.01) | |
| C08K 5/41 | (2006.01) | |
| C08K 5/1515 | (2006.01) | |
| C08J 3/05 | (2006.01) | |
| C09D 145/02 | (2006.01) | |
| C09J 145/02 | (2006.01) | |

(52) U.S. Cl.
CPC ... *C08K 5/41* (2013.01); *C08J 3/05* (2013.01); *C08J 2345/02* (2013.01); *C09D 145/02* (2013.01); *C09J 145/02* (2013.01); *C08K 5/1515* (2013.01)

(58) Field of Classification Search
USPC .......... 524/549, 366, 376, 369, 157, 236, 284
See application file for complete search history.

(56) References Cited

U.S. PATENT DOCUMENTS

| | | | | |
|---|---|---|---|---|
| 2,051,410 | A * | 8/1936 | Kenney | ......................... 524/442 |
| 2007/0298111 | A1 | 12/2007 | Ueki | |

FOREIGN PATENT DOCUMENTS

| | | |
|---|---|---|
| JP | 2-86644 | 3/1990 |
| JP | 2-86645 | 3/1990 |
| JP | 2002-172610 | 6/2002 |
| JP | 2002-332456 | 11/2002 |
| JP | 2003-183406 | 7/2003 |
| WO | WO 2006/038552 A1 | 4/2006 |

OTHER PUBLICATIONS

International Search Report issued by the Japanese Patent Office on Feb. 14, 2012, for International Patent Application No. PCT/JP2011/006198.

* cited by examiner

*Primary Examiner* — Vu A Nguyen
(74) *Attorney, Agent, or Firm* — Finnegan, Henderson, Farabow, Garrett & Dunner, L.L.P.

(57) ABSTRACT

As a manufacturing method of a stable coumarone-indene resin water-dispersed composition which does not use an organic solvent, can be applied to various resin compositions, enhance sticky and adhesive properties, water resistance, heat resistance, and compatibility, and achieve consideration of health and safety of operators, arrangement of a work environment, and cost reduction relating to exhaust gas treatment, a manufacturing method which includes a process of dispersing a coumarone-indene resin which contains 50% by weight or more of coumarone and indene in total as monomer-constituents and is in a solid form at an ordinary temperature in the presence of a surfactant by a wet milling and dispersing method is used.

6 Claims, No Drawings

MANUFACTURING METHOD OF COUMARONE-INDENE RESIN WATER-DISPERSED COMPOSITION AND WATER-DISPERSED COMPOSITION

TECHNICAL FIELD

The present invention relates to a manufacturing method of a coumarone-indene resin water dispersion which is used as an adhesive agent base, a tackifier, a paint additive, a binder resin, a resin modifier, a surface modifier, a size property applicator, a hydrophobizing agent, a surface protective agent, an extender, and the like in various products and in various fields for use such as various adhesive agents, an adhesive tape, a paint, tire and rubber products, a resin for printing and ink, paper, fiber, a carpet, and a road paver, and to a water-dispersed composition which is obtained by the manufacturing method.

BACKGROUND ART

In the related art, a coumarone-indene resin which contains coumarone and indene as main components has been widely used as an adhesive agent base, a tackifier, a paint additive, a binder resin, a resin modifier, a surf ace modifier, a size property applicator, a hydrophobizing agent, a surface protective agent, an extender and the like in various products and fields for usage such as various adhesive agents, an adhesive tape, a paint, tire and rubber products, a resin for printing and ink, paper, fiber, a carpet, and a road paver. The coumarone-indene resin has been usually used as a resin, solution dissolved in an organic solvent or in a hot melt form when used for the above usage purposes.

However, such a coumarone-indene resin in the related art has various problems in regard to a health hazard by the organic solvent, environmental pollution, VOC discharge, risk of fire, exhaust gas treatment, residual solvent treatment, consumption of thermal energy, investment for hot melt facilities and the like, health and safety of operators, Fire Defense Law, environment-related regulation, economic efficiency in processes, and the like.

In response, shift of the resin to a water-based resin has been attempted in recent years in order to utilize features of a coumarone-indene resin which is excellent in water resistance, applications of sticky and adhesive properties, heat resistance, blocking resistance, compatibility, and the like. As a result, a technique relating to an emulsion composition of a hydrogenated coumarone-indene resin which is obtained by mixing and emulsifying the hydrogenated coumarone-indene resin in the presence of a hydrocarbon solvent, water, and an emulsifier, and/or an emulsion stabilizer by using a hydrocarbon solvent solution of the hydrogenated coumarone-indene as a starting material has been disclosed (see Patent Documents 1 and 2, for example).

However, the hydrogenated coumarone-indene resin emulsion composition cannot always exhibit the above performances sufficiently, and there are still many problems to be solved. For example, there is a problem that applicable resin compositions are limited, and problems in terms of health and safety such as degradation of work environment due to containing the organic solvent and health hazard, and problems of risk of fire, exhaust gas treatment, VOC reduction, and the like have not been solved.

CITATION LIST

Patent Literature

[PTL 1] JP-A-02-086644
[PTL 2] JP-A-02-086645

SUMMARY OF INVENTION

Technical Problem

The present invention was made in view of the above circumstances, and an object thereof is to provide a manufacturing method of a coumarone-indene resin water-dispersed composition which does not use an organic solvent, can be applied to various resin compositions, and further can achieve consideration of health and safety of operators, arrangement of a work environment, and cost reduction relating to exhaust gas treatment, and to provide a stable water-dispersed composition which is obtained by the manufacturing method and has satisfactory sticky and adhesive properties, water resistance, heat resistance, and compatibility.

Solution to Problem

In order to solve the above problems, a manufacturing method of a coumarone-indene resin according to the present invention is a manufacturing method of a coumarone-indene resin water dispersion includes a process of dispersing a coumarone-indene resin in the presence of a surfactant, by a wet milling and dispersing method, wherein the coumarone-indene resin contains 50% by weight or more of coumarone and indene in total as monomer constituents and is in a solid form at an ordinary temperature.

The "wet milling and dispersing method" in the present invention means a method for obtaining a dispersion by milling and stirring a coumarone-indene resin, which is in a solid form at an ordinary temperature, in a water medium by mechanical means. In addition, the "dispersion" described herein means solid fine particles floating in a water medium and is distinguished from "an emulsified substance" or "an emulsion" which means liquid fine particles floating in the water medium.

According to the manufacturing method of a water-dispersed composition of the present invention, a combination of a surfactant (a) which is represented by Formula (I) and a surfactant (b) which is represented by Formula (II) is preferably used as the surfactant.

[Chem. 1]

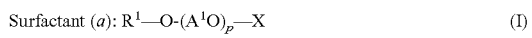

Surfactant (a): $R^1$—O-$(A^1O)_p$—X    (I)

Surfactant (b): $R^2$—O-$(A^2O)_q$—H    (II)

In Formula (I), $R^1$ represents one or more selected from a group consisting of an alkyl group having eight to twenty-two carbons, an alkenyl group having eight to twenty-two carbons, and an aromatic derivative residue represented by any of Formulae (III) to (V), $A^1O$ represents an oxyalkylene group having two to four carbons, p represents an average addition mole number of an alkylene oxide, which is a number from zero to thirty, and X represents an anionic group which is represented by any of Formulae (VI) to (VIII), wherein M in Formulae (VI) to (VIII) represents any one of a hydrogen atom, an alkali metal atom, ammonium, and an alkanolamine, and in Formula (II), $R^2$ represents one or more selected from a group consisting of an alkyl group having eight to fifteen carbons, an alkenyl group having eight to fifteen carbons, and an aromatic derivative residue which is represented by any of Formulae (III) to (V), $A^2O$ represents an oxyalkylene group having two to four carbons, and q represents an average addition mole number of an alkylene oxide, which is a number from 0 to 200.

[Chem. 2]

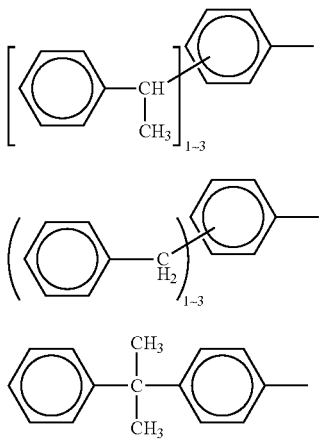

[Chem. 3]

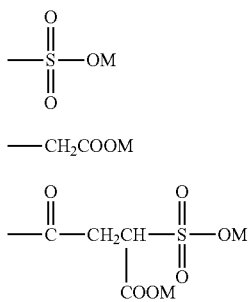

A cationic surfactant which is represented by Formula (IX) may be preferably used as the surfactant.

[Chem. 4]

In Formula (IX), one or two groups of $R^3$, $R^4$, $R^5$, and $R^6$ represents a long-chain alkyl group having ten to twenty carbons or a long-chain hydroxyalkyl group, the residual groups thereof represent an alkyl group having one to three carbons, a hydroxyalkyl group, a benzyl group, or a polyoxyethylene group with a total addition mole number of 10 or less, and Y represents a halogen atom or an alkyl sulfuric acid group having one or two carbons.

A surfactant (c) which is represented by Formula (X) may be further used as the surfactant in addition to the surfactant (a) which is represented by Formula (I) and the surfactant (b) which is represented by Formula (II).

[Chem. 5]

Surfactant (c): $R^7$—$SO_3M$  (X)

In Formula (X), $R^7$ represents one or more selected from a group consisting of a primary or secondary alkyl group having ten to fifteen carbons, a primary or secondary alkenyl group having ten to fifteen carbons, a primary or secondary hydroxyalkyl group having ten to eighteen carbons, an alkyl benzene residue, and a dialkyl succinate residue, and M represents a hydrogen atom, an alkali metal atom, ammonium, or an alkanolamine.

A coumarone-indene resin water-dispersed composition according to the present invention is obtained by any of the manufacturing methods according to the present invention.

Advantageous Effects of Invention

The present invention can be applied to a thermoplastic coumarone-indene resin which is in a solid form at an ordinary temperature and has a wide softening point range, and the water dispersion has excellent mechanical stability, chemical stability, preservation stability, freezing stability, and blending stability. In addition, since the water dispersion can be obtained without using a solvent, there are advantages in terms of commercial production that the coumarone-indene resin water-dispersed composition is not subjected to the restriction of the Fire Defense Law, and that consideration of health and safety of operators and an environment, arrangement of a work environment, and cost reduction relating to exhaust gas treatment or the like can be realized.

Particularly, the water dispersion which is prepared by using a cationic surfactant does not cause generation of aggregation substances or an increase in viscosity even when mixed with an other cationic water-dispersed composition or an O/W type emulsion, and has a great deal of potential in industries in terms of the fact that an application range of the coumarone-indene resin can be further extended.

In addition, the manufacturing method according to the present invention has a great deal of potential in industries in terms of the fact that it is possible to easily and economically prepare the water dispersion which has the above features of the coumarone-indene resin which is in a solid form at an ordinary temperature and has a thermoplastic property. In addition, there is no problem in that strength of heat-resistant adhesion is lowered since the organic solvent is not used, there is less remaining odor, and the manufacturing method has a potential even in terms of health and safety of operators, measures against fire and flame of facilities, and a point that there is no restriction of the Fire Defense Law in handling the products.

DESCRIPTION OF EMBODIMENTS

Hereinafter, a detailed description will be given of conditions and the like for obtaining a water-dispersed composition by using a coumarone-indene resin which is in a solid form at an ordinary temperature according to the present invention.

1. Coumarone-Indene Resin

The coumarone-indene resin as an application target of the present invention is a coumarone-indene resin which contains 50% by weight or more of coumarone and indene in total as monomer constituents and is in a solid form at an ordinary temperature. It is assumed that coumarone contains coumarones such as methylcoumarone, and indene contains indenes such as methylindene. Examples of the monomer constituents other than coumarone and indene include styrene, vinyl toluence, and dicyclopentadiene. Although the monomer composition is appropriately selected based on a usage purpose of the resin, about 1% by weight to 20% by weight of coumarone and about 40% by weight to 95% by weight of indene are typically contained. Examples of the coumarone-indene resin which is available as commercial products include Nitto Resin Coumarone G90, G-100N, V-120, V-120S, and H-100 (all of which are product names) manufactured by Nitto Chemical Co., Ltd.

In relation to a softening point of the coumarone-indene resin, although the softening point of the coumarone-indene resin is not particularly limited by features of the wet milling and dispersing process, the softening point is preferably 60° C. or more, and more preferably from 70° C. to 170° C. in terms of securing stability of the water dispersion, applicability to a desired application purpose, a satisfactory blending property, a coating property, and a viscosity application property.

2. Surfactant and Other Blended Constituents
(1) Applicable Surfactant

According to the present invention, it is possible to appropriately use various surfactants for the purpose of dispersing the coumarone-indene resin in water by using a wet milling and dispersing apparatus, Examples of the applicable surfactant will be exemplified. Specific examples of non-ionic surfactants include a polyoxyalkylene alkylphenyl ether, a polyoxyalkylene alkyl ether, a polyoxyalkylene styrenated phenyl ether, a polyoxyalkylene benzylated phenyl ether, a polyoxyalkylene paracumylphenyl ether, a polyoxyalkylene fatty acid ester, a higher alcohol fatty acid ester alkylene oxide adduct, a higher alkylamine alkylene oxide adduct, a fatty acid amide alkylene oxide adduct, an alkylglycoside, and a sucrose fatty acid ester.

In addition, specific examples of the anionic surfactant include a higher alcohol sulfate ester salt, a polyoxyalkylene alkyl ether sulfate, a polyoxyalkylene styrenated phenyl ether sulfate ester salt, a polyoxyalkylene alkyl ether sulfosuccinate, an alkyl benzene sulfonate, an alkyl diphenylether sulfonate, an alpha olefin sulfonate, a dialkyl sulfosuccinate, an alkane sulfonate, a secondary alkane sulfonate, an alkyl naphthalene sulfonate, naphthalene sulfonate formalin condensate, and further, a higher alcohol phosphate ester salt, a polyoxyalkylene alkyl ether phosphate, a polyoxyalkylene styrenated phenyl ether phosphate, a polyoxyalkylene alkyl ether carboxylate, a fatty acid soap, a disproportionated rosin soap, and Turkey red oil.

In addition, specific examples of the cationic surfactant include an alkyl trimethylammonium salt, an alkyldimethylethylammonium ethylsulfate, an alkyldimethylbenzylammonium salt, an alkyldimethylhydroxyethylammoonium salt, an alkyldihydroxyethylmethylammonium salt, a dialkyldimethylammonium salt, a fatty acid dimethylaminopropylamide/fatty acid neutralizing material, a higher amine salt, and an alkyl pyridinium salt.

Furthermore, specific examples of the ampholytic surfactant include an alkylbetaine, a fatty acid amide propyl betaine, a 2-alkyl-N-carboxymethyl-N-hydroxyethyl imidazoliumbetaine, an alkyl diethylene triamino acetic acid, a dialkyl diethylene triamino acetic acid, and an alkylamine oxide.

In addition, specific examples of the high-molecule surfactant include a polyacrylate, a polymethacrylate, polydiaryl dimethyl, ammonium chloride, styrene/maleic acid copolymer ammonium salt, styrene/maleic acid half ester copolymer ammonium salt, naphthalene sulfonic acid sodium formalin condensate, a polyalkylene polyamine alkylene oxide adduct, a polyalkylene polyimine alkylene oxide adduct, polyvinyl pyrrolidone, polyvinyl alcohol (partial-saponified type), polystyrene sulfonate, polymethyl vinyl ether, polyacrylamide, polyethyleneimine, polyvinyl pyridine quaternary ammonium, carboxyvinyl polymer, an alkyl vinyl ether/maleic acid alternating copolymer (salt), vinyl acetate/maleic acid copolymer (salt), diisobutylene/maleic acid copolymer (salt), an alkyl vinyl ether/maleic acid diethyl alternating copolymer (salt), octadecene/vinyl acetate copolymer, maleic polybutene, maleic polybutadiene, a telomer type, surfactant, a polyallyl type cation oligo soap, a cationic cellulose, and carboxymethylcellulose.

Although the use amounts of these surfactants may be appropriately selected within a range in which the desired water dispersion can be obtained by the wet milling and dispersing process and are not particularly limited, the additive amount thereof is generally within a range from 0.1 parts by weight to 200 parts by weight with respect to 100 parts by weight of the coumarone-indene resin.

However, it is preferable to select the specific surfactants described below when it is desired to increase the content of the resin in the water dispersion and further enhance mechanical stability, chemical stability, preservation stability, freezing stability, blending stability, and the like of the obtained water dispersion. Usage of such surfactants has a great deal of industrial potential in terms of the fact that it is possible to easily mix them with a known non-ionic or anionic resin water dispersion, a resin emulsion, latex, an O/W type emulsion such as waxes, fatty oils, and mineral oils, an organic pigment water dispersion, an inorganic pigment water dispersion, a dye water dispersion, and a water dispersion of various fillers, that no aggregation substance is generated at that time, that defects such as an increase in viscosity and non-uniformity do not occur, and that application range of the coumarone-indene resin can be further expanded.

(2) Surfactant (a) and Surfactant (b)

According to the present invention, it is possible to increase the content of the resin (in terms of solid) and enhance dispersion stability and the like of the water dispersion by using both the following surfactant (a) and surfactant (b).

[Chem. 6]

$$\text{Surfactant } (a): R^1-O-(A^1O)_p-X \qquad (I)$$

$$\text{Surfactant } (b): R^2-O-(A^2O)_q-H \qquad (II)$$

The surfactant (a) is represented by Formula (I), $R^1$ in the formula represents an alkyl group having eight to twenty-two carbons, an alkenyl group having eight to twenty-two carbons, or an aromatic derivative residue represented by any of the following Formulae (III) to (V), or may be two or more among them.

[Chem. 7]

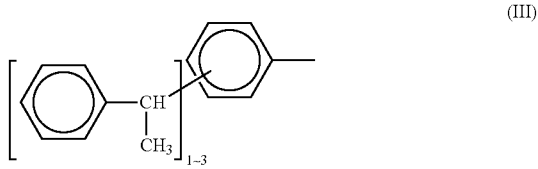

(III)

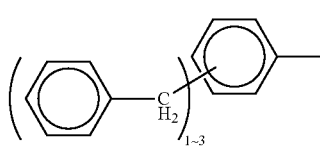

(IV)

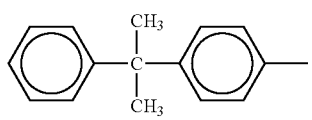
(V)

The surfactant (b) is represented by Formula (II), and $R^2$ in the formula represents an alkyl group having eight to fifteen carbons, an alkenyl group having eight to fifteen carbons, or an aromatic derivative residue represented by any of the above Formulae (III) to (V), or may be two or more among them. Particularly, $R^2$ is preferably a branched-alkyl group having eight to eleven carbons.

In Formulae (I) and (II), $A^1O$ and $A^2O$ respectively represent oxyalkylene groups having two to four carbons. An oxyalkylene group which can be preferably used in the present invention is an oxyethylene group, an oxypropylene group, or an oxybutylene group and can be obtained from ethylene oxide (EO), propylene oxide (PO), OR 1,2-butylene oxide (BO) by a known polymerization method. At this time, oxyalkylene chains, -($A^1O$)p-, -($A^2o$)q- may be homopolymer chains of alkylene oxide having two to four carbons, random polymer chains, block polymer chains, or a combination thereof. In addition, p and q in the oxyalkylene chains, -($A^1O$)p-, -($A^3o$)q- respectively represent average addition mole numbers, p ranges from 0 to 30, and preferably from 5 to 20, q ranges from 0 to 200, and preferably from 10 to 100, X in Formula (I) represents an anionic group represented by any of the following Formulae (VI) to (VIII), and M in Formulae (VI) to (VIII) represents a hydrogen atom, an alkali metal atom, ammonium, or an alkanolamine.

[Chem. 8]

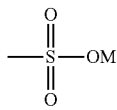
(VI)

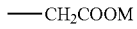
(VII)

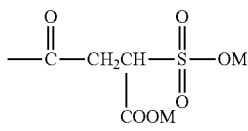
(VIII)

Although $R^1$ is an alkyl group having eight to twenty-two carbons, an alkenyl group having eight to twenty-two carbons, or an aromatic derivative residue represented by the above Formulae (III) to (V) in the surfactant represented by Formula (I) as described above, a known higher alcohol can be used when $R^1$ is an alkyl group and/or an alkenyl group, the raw material thereof may be a synthetically-derived raw material or a naturally derived raw material, and the number of carbons in the higher alcohol may be the same or the alcohol may be a mixture of alcohols with different carbon numbers. In addition, the chemical structure thereof may be a single composition or a mixture constituted by a plurality of isomers. In addition, two or more of higher alcohols may be blended and used. Specific examples thereof include propylene, butene, and isooctanol, isononanol, isodecanol, isoundecanol, isododecanol, isotridecanol, NEODOL 23, 25, and 4.5 (manufactured by Shell Chemicals Japan Limited), SAFOL 23 (manufactured by Sasol Limited), EXXAL7, EXXAL8N, EXXAL9, EXXAL10, EXXAL11, and EXXAL13 (manufactured by ExxonMobile Chemical Company) manufactured by an oxo method via a higher olefin derived from the mixture of propylene and butene, which are examples of higher alcohols which can be preferably used. Furthermore, naturally-derived octyl alcohol, decyl alcohol, lauryl alcohol (1-dodecanol), myristyl alcohol (1-tetradecanol), cetyl alcohol (1-hexadecanol), stearyl alcohol (1-octadecanol), oleyl alcohol (cis-5-octadecene-1-ol), and the like are also examples of higher alcohols which can be used. In addition, a Guerbet Alcohol which has a 2-alkyl-1-alkanol type chemical structure and the like are also examples of higher alcohols which can be preferably used, examples of which include 2-ethyl-1-hexanol, 2-propyl-1-hexanol, 2-butyl-1-hexanol, 2-ethyl-1-heptanol, 2-ethyl-1-octanol, 2-propyl-1-heptanol, and 2-pentyl-1-nonanol as well as isostearyl alcohol, 3,5,5-trimethyl-1-hexanol, and SOFTANOL (a name of a product manufactured by Nippon Shokubai Co., Ltd.) which is a secondary alcohol derived from normal paraffin.

When $R^1$ in the surfactant represented by Formula (I) is an aromatic derivative residue, Formula (III) represents a styrenated phenol residue, and a simple substance or a mixture of monostyrenated phenol, distyrenated phenol, and tristyrenated phenol can be used. In addition, Formula (IV) represents a benzylated phenol residue which is derived from a simple substance or a mixture of monobenzylated phenol, dibenzylated phenol, and tribenzylated phenol. Moreover, Formula (V) represents a p-cumylphenol residue, and p-cumylphenol can be used.

In the surfactant represented by Formula (II), $R^2$ represents an alkyl group having eight to fifteen carbons, an alkenyl group having eight to fifteen carbons, or an aromatic derivative residue represented by any of the above Formulae (III) to (V). When $R^2$ is an alkyl group having eight to fifteen carbons, is preferably a branched-alkyl group having eight to eleven carbons. Higher alcohols may have the same number of carbons or may be a mixture of alcohols with different carbon numbers. In addition, the chemical structure thereof may be a single composition or a mixture constituted by a plurality of isomers. In addition, two or more of higher alcohols may be blended and used. Specific examples thereof include propylene, butene, and isooctanol, isononanol, isodecanol, isoundecanol, isododecanol, isotridecanol, NEODOL 23, 25, and 45 (manufactured by Shell Chemicals Japan Limited), SAFOL 23 (manufactured by Sasol Limited), EXXAL7, EXXAL8N, EXXAL9, EXXAL10, EXXAL11, and EXXAL13 (manufactured by ExxonMobile Chemical Company) manufactured by an oxo method via a higher olefin derived from the mixture of propylene and butene, which are examples of higher alcohols which can be preferably used. Furthermore, naturally-derived octyl alcohol, decyl alcohol, lauryl alcohol (1-dodecanol), myristyl alcohol (1-tetradecanol), and the like are also examples of higher alcohols which can be used. In addition, a Guerbet Alcohol which has a 2-alkyl-1-alkanol type chemical structure and the like are also examples of higher alcohols which can be preferably used, examples of which include 2-ethyl-1-hexanol, 2-propyl-1-hexanol, 2-butyl-1-hexanol, 2-ethyl-1-heptanol, 2-ethyl-1-octanol, 2-propyl-1-heptanol, and 2-pentyl-1-nonanol as well as 3,5,5-trimethyl-1-hexanol, and SOFTANOL (a name of a product manufactured by Nippon Shokubai Co., Ltd.) which is a secondary alcohol derived from normal paraffin. When $R^2$ is an aromatic derivative residue represented by any of Formulae (III) to (V), the same substances as those described for $R^1$ in Formula (I) can be used.

In order to achieve the object of the present invention, the usage amount of the surfactants (a) and (b) may be selected within a range in which the desired water dispersion can be obtained by the wet milling and dispersing process and is not particularly limited. However, the usage, amount thereof is preferably within a range from 0.1 parts by weight to 200 parts by weight with respect to 100 parts by weight of the coumarone-indene resin, and more preferably within a range from 1 part by weight to 20 parts by weight. When the amount of the surfactant is less than the range, a problem that it is difficult to obtain a sufficient dispersion effect, that it is difficult to achieve a desired fine particle size in the wet milling of the coumarone-indene resin, that a process time required for achieving the desired particle size is extended, that stability deteriorates even if the desired fine particle size has been achieved, or that it is not possible to increase the content of the resin in the water dispersion, that is, it is not possible to increase the concentration occurs in some cases. On the other hand, if the amount of the surfactant is more than the range of the preferable adding amount, problems such as a trouble in the process due to foaming of the water dispersion, a trouble due to foam in the coating process, and further, deterioration of water resistance of the coating film, deterioration of sticky and adhesive properties, deterioration of heat resistance, transparency of the coating film, deterioration of a final appearance, and the like tend to occur. Although the blending ratio between the surfactant (a) and the surfactant (b) is not particularly limited, the blending ratio is preferably from 10:90 to 90:10, and more preferably from 70:30 to 90:10 in terms of weight.

(3) Cationic Surfactant

According to the present invention, the coumarone-indene resin which is in a solid form at an ordinary temperature can be prepared by using a cationic surfactant. Particularly, the water dispersion which is prepared by using a predetermined cationic surfactant has excellent mechanical stability, chemical stability, preservation stability, freezing stability, blending stability, and the like, and furthermore, usage of such surfactants has a great deal of industrial potential in terms of that it is possible to easily mix them with a known non-ionic or cationic resin water-dispersion, a resin emulsion, latex, an O/W type emulsion such as waxes, fatty oils, and mineral oils, an organic pigment water dispersion, an inorganic pigment water dispersion, a dye water dispersion, and a water dispersion of various fillers, that no aggregation substance is generated at that time, that defects such as an increase in viscosity and non-uniformity do not occur, and that application range of the coumarone-indene resin can be further expanded.

The cationic surfactant which can be used in the present invention is represented by the following Formula (IX), and in Formula (IX), one or two groups among $R^3$, $R^4$, $R^5$, and $R^6$ are a long-chain alkyl group or a long-chain hydroxyalkyl group having ten to twenty carbons, and the residual groups thereof represent an alkyl group, a hydroxyalkyl group, or a benzyl group having one to three carbons, or a polyoxyethylene group with a total addition mole number of 10 or less, and Y represents a halogen atom or an alkyl sulfuric acid group having one or two carbons. Any group may be two or more selected from the examples.

[Chem. 9]

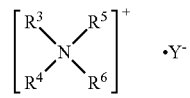

(IX)

Specific, examples of the cat ionic surfactant which can be preferably used include lauryl trimethyl ammonium chloride, cetyl trimethyl ammonium chloride, stearyl trimethyl ammonium chloride, lauryl dimethyl ethyl ammonium ethyl sulfate, palmityl dimethylethyl ammonium ethyl sulfate, lauryl dimethyl benzyl ammonium chloride, lauryl dimethyl hydroxyethyl ammonium chloride, stearyl dimethyl hydroxyethyl ammonium chloride, lauryl dihydroxyethyl methyl ammonium, chloride, stearyl dihydroxyethyl methyl ammonium chloride, didecyl dimethyl ammonium chloride, and distearyl dimethyl ammonium chloride, but the cationic surfactant is not limited thereto.

Although the usage amount of the cationic surfactant may be selected within a range in which the desired water dispersion can be obtained and is not particularly limited, the usage amount thereof is preferably from 0.1 parts by weight to 200 parts by weight, and more preferably from 1 part by weight to 20 parts by weight with respect to 100 parts by weight of the coumarone-indene resin.

(4) Surfactant (c)

According to the present invention, it is possible to further enhance the characteristics and the dispersion stability such as mechanical stability, chemical stability, preservation stability, freezing stability, and blending stability of the water dispersion according to the present invention derived from the coumarone-indene resin which is in a solid form at an ordinary temperature by using a surfactant (c) along with the above surfactant (a) and surfactant (b). Addition of the surfactant (c) may be performed before or after the wet milling and dispersing process. However, it is not possible to apply the surfactant (c) to the water dispersion which is prepared by using the cationic surfactant, The surfactant (c) is represented by the following Formula (X), and $R^7$ in the formula represents a primary or secondary alkyl group having ten to fifteen carbons, a primary or secondary alkenyl group having ten to fifteen carbons, a primary or secondary hydroxyalkyl group having ten to eighteen carbons, an alkyl benzene residue, or a dialkyl succinate residue represented by the following Formula (XI), $R^8$ in the formula represents a primary alkyl group having four to ten carbons, M represents a hydrogen atom, an alkali metal atom, ammonium, or alkanolamines, and $R^7$ and M may be two or more selected from the examples.

[Chem. 10]

Surfactant (c): $R^7\mathrm{-SO_3M}$ (X)

[Chem. 11]

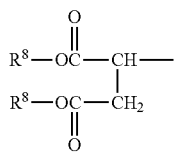

(XI)

Among surfactants which can be represented by Formula (X), specific examples of the surfactant which can be preferably used include sodium alkylbenzene sulfonate, sodium alkane sulfonate, sodium secondary alkane sulfonate, sodium alpha olefin sulfonate, and sodium dioctyl sulfosuccinate.

Although the blending amount in the case where the surfactant (c) is blended is not particularly limited, the blending amount is preferably from 0.01 parts by weight to 10 parts by weight, and more preferably from 0.1 parts by weight to 5 parts by weight with respect, to 100 parts by weight of the coumarone-indene resin, (5) Other Blended Constituents It is possible to add a known surfactant or a known protective colloid agent to the obtained coumarone-indene resin water dispersion during or after the wet milling and dispersing process for the purpose of further enhancing the dispersion stability such as mechanical stability, chemical stability, preservation stability, freezing stability, and blending stability of the water dispersion.

Applicable surfactants are as described above, and specific examples of the protective colloid agent include carboxymethylcellulose salt, xanthane gum, gum arable, locust bean gum, sodium alginate, a self-emulsification type polyester compound, water-soluble polyester, polyvinyl alcohol, partially saponified polyvinyl alcohol, gelatin, polyacrylate, styrene-maleic anhydride copolymer, polyvinyl pyrrolidone, polyethylene oxide, polyacrylamide, methoxyethylene maleic anhydride copolymer, methylcellulose, hydroxyethylcellulose, hydroxypropylcellulose, soluble starch, carboxylmethyl starch, and cationic starch.

In addition, it is possible to add a known antifoaming agent, an antiseptic agent, and auxiliary agents such as a film forming auxiliary agent, a leveling agent, a pH adjusting agent, and an extender to the coumarone-indene resin water dispersion which is obtained in the present invention within a range that does not inhibit the characteristics and stability thereof.

3. Manufacturing Method of Coumarone-Indene Resin Water Dispersion

As a wet milling and dispersing apparatus which can be used in the present invention, it is possible to use an apparatus based on a known scheme, and specific examples include a high-pressure fluid collision mill, a high-speed rotating slit mill, a medium stirring mill, a roll mill, a ring-shaped milling medium mill, a high-speed rotating thin film mill, and an oscillating mill (shaker type). A medium stirring mill is preferable in terms of production efficiency such as ease of an increase in scale and applicability to continuous production in commercial production and ease of maintenance and management of facilities. The medium stirring mill includes an Attritor type, a ball mill type, and a bead mill type, and specific examples include Attritor (a name of a product manufactured by Nippon Coke & Engineering Co., Ltd.), Dainomill (a name of a product manufactured by Shinmaru Enterprises Corporation), Biscomil (a name of a product manufactured by IMEX Co., Ltd.), Sand Grinder: (a name of a product manufactured by IMEX Co., Ltd.), Colloid Mill (a name of a product manufactured by Tokushukika Kogyo Co., Ltd.), and Pearl Mill (a name of a product manufactured by Ashizawa Fin tech Ltd.).

In addition, examples of applicable media include a glass bead, a low-alkali glass bead, an alkali-free glass bead, a ceramic bead, an alumina bead, a zirconia bead, and an iron bead. In the present invention, the glass bead, the low-alkali glass bead, and the alkali-free glass bead can be preferably used in terms of the fact that they are relatively inexpensive and can be easily handled. In addition, the zirconia bead is also an example of media which can be preferably used in terms of the fact that contamination derived from the media hardly occurs, and that milling efficiency is satisfactory due to hardness of the bead and a high specific gravity. Moreover, examples of a method for separating the media include a screen type, a gap separator type, a centrifugal separation type, a type of combination use of centrifugal separation and screen, and a known method can be appropriately selected from the examples.

In addition, although an order of pouring in of water, the surfactant, the coumarone-indene resin, and other auxiliary agents is not particularly limited as long as it does not inhibit the effects of the present invention, it is preferable to include a first process for adding the surfactant to water and a second process for adding the coumarone-indene resin to the surfactant solution, and to further include a third process for adding various auxiliary agents thereto, In the first process, it is possible to intentionally or unintentionally allow a water-soluble solvent other than water to be present together within a range in which stability of the system during the wet milling and dispersing process does not deteriorate for the purpose, of enhancing a processing property of the water dispersion, a mixing property with other water dispersion, and a coating film formation property, and a type of the water-soluble solvent is not particularly limited.

In the second process, conditions when the coumarone-indene resin is poured into the surfactant solution are not particularly limited, and the temperature of the liquid at the time of the pouring is preferably equal to or less than 30° C. since the temperature of the process liquid increases during the wet milling and dispersing process. In addition, a heat, removing operation or a cooling operation performed by a predetermined method during the operation of the wet milling and dispersing apparatus, and during an adjustment process and preservation and filling processes of the water dispersion in the process is a preferable operation in the present invention, and the temperature of the coumarone-indene water dispersion during the treatment is preferably from 5° C. to 50° C., and more preferably from 10° to 30°.

The solid content in the coumarone-indene resin water dispersion which is obtained by the present invention is preferably within a range from 1% by weight to 60% by weight. In addition, the average particle size of the coumarone-indene resin water dispersion in the present invention is preferably within a range from 0.1 μm to 20 μm, and more preferably within a range from 0.1 μm to 5 μm.

EXAMPLES

Although a more specific, description of the present invention will be given below based on the examples, the present invention is not limited to the following examples. In addition, "part" or "%" means "parts by weight" or "% by weight" unless otherwise noted.

1. Preparation of Coumarone-Indene Resin Water Dispersion (Resin Solid Content; 30%)

(1) Preparation of Water Dispersion

After respective constituents to be blended were poured in accordance with the blending prescription shown in Table 1 below, 100 mL of each prescribed liquid in examples and comparative examples was then mixed and stirred, the same volume of glass beads with a diameter of 1.0 mm was added thereto, Sand Grinder manufactured by IMEX Co., Ltd. was filled with the mixture, and the wet milling and dispersing treatment was performed. After the treatment, the glass beads and the coumarone-indene resin water dispersion were separated by an 80-mesh filter cloth, (2) Evaluation and the Like of Dispersion Measurement of an average particle size and evaluation on dispersion stability and compatibility were performed for the obtained water dispersion by the following methods. The results will be shown in Table 1.

[1] Average Particle Size

The average particle size of the coumarone-indene water dispersion immediately after the wet milling and dispersing was measured by a laser diffraction type particle size distribution measurement apparatus (manufactured by Shimadzu Corporation, product name: SALD-2200),

[2] Dispersion Stability

The obtained water dispersion was moved into a transparent container, and a dispersing property of the dispersion in the container was evaluated based on the following criteria by visually observing the state of the dispersion one day after the dispersing treatment.

⊙: Uniform dispersion is observed.

○: Although surface syneresis is slightly observed, the dispersion is recovered to an original state if the dispersion is shaken.

Δ: The dispersion has been separated into two layers and is not recovered to the original state even if the dispersion is shaken.

X; The dispersion has been agglutinated.

[3] Compatibility

By visually observing a state where 50 g of the coumarone-indene water dispersion immediately after the wet milling and dispersing was mixed with 50 g of an acrylic resin emulsion (manufactured by Chuorikakoguo Co., Ltd., product name: Rikabond AP-80, anionic), compatibility was evaluated by the following criteria.

○: Uniform dispersion is observed.

X: The dispersion has been agglutinated,

TABLE 1

| Composition | Example 1-1 | Example 1-2 | Example 1-3 | Example 1-4 | Example 1-5 | Example 1-6 | Example 1-7 | Example 1-8 | Example 1-9 |
|---|---|---|---|---|---|---|---|---|---|
| Coumarone-indane resin | 30 | 30 | 30 | 30 | 30 | 30 | 30 | 30 | 30 |
| Water | 67 | 67 | 67 | 67 | 65 | 65 | 65 | 65 | 65 |
| Surfactant (1) | 3 | — | — | — | — | — | — | — | — |
| Surfactant (2) | — | 3 | — | — | — | — | — | — | — |
| Surfactant (3) | — | — | 3 | — | — | — | — | — | — |
| Surfactant (4) | — | — | — | 3 | — | — | — | — | — |
| Surfactant (5) | — | — | — | — | 5 | — | — | — | — |
| Surfactant (6) | — | — | — | — | — | 5 | — | — | — |
| Surfactant (7) | — | — | — | — | — | — | 5 | — | — |
| Surfactant (8) | — | — | — | — | — | — | — | 5 | — |
| Surfactant (9) | — | — | — | — | — | — | — | — | 5 |
| Surfactant (10) | — | — | — | — | — | — | — | — | — |
| Surfactant (11) | — | — | — | — | — | — | — | — | — |
| Surfactant (12) | — | — | — | — | — | — | — | — | — |
| Water-soluble polymer (1) | — | — | — | — | — | — | — | — | — |
| Water-soluble polymer (2) | — | — | — | — | — | — | — | — | — |
| Wet milling and dispersing time (hour) | 5 | 5 | 5 | 5 | 5 | 7 | 5 | 5 | 5 |
| Average particle size (μm) | 1.7 | 1.4 | 1.1 | 1.0 | 2.5 | 1.5 | 2.8 | 1.8 | 3.0 |
| Dispersing stability (oneday later) | ⊙ | ⊙ | ⊙ | ⊙ | ⊙ | ⊙ | ⊙ | ⊙ | ⊙ |

| Composition | Example 1-10 | Example 1-11 | Example 1-12 | Example 1-13 | Comparative Example 1-1 | Comparative Example 1-2 | Comparative Example 1-3 |
|---|---|---|---|---|---|---|---|
| Coumarone-indane resin | 30 | 30 | 30 | 30 | 30 | 30 | 30 |
| Water | 65 | 65 | 65 | 65 | 70 | 66 | 66 |
| Surfactant (1) | — | — | — | — | — | — | — |
| Surfactant (2) | — | — | — | — | — | — | — |
| Surfactant (3) | — | — | — | — | — | — | — |
| Surfactant (4) | — | — | — | — | — | — | — |
| Surfactant (5) | — | — | — | — | — | — | — |
| Surfactant (6) | — | — | — | — | — | — | — |
| Surfactant (7) | — | — | — | — | — | — | — |
| Surfactant (8) | — | — | 4 | — | — | — | — |
| Surfactant (9) | — | — | — | — | — | — | — |
| Surfactant (10) | 5 | — | — | — | — | — | — |
| Surfactant (11) | — | 5 | — | — | — | — | — |
| Surfactant (12) | — | — | — | 5 | — | — | — |
| Water-soluble polymer (1) | — | — | 1 (Externally added) | — | — | 4 | — |
| Water-soluble polymer (2) | — | — | — | — | — | — | 4 |
| Wet milling and dispersing time (hour) | 5 | 5 | 6 | 7 | 7 | 7 | 7 |

TABLE 1-continued

| Average particle size (μm) | 3.5 | 2.0 | 2.5 | 3.1 | Not dispersed | Not dispersed | Not dispersed |
|---|---|---|---|---|---|---|---|
| Dispersing stability (oneday later) | ⊙ | ⊙ | ⊙ | ⊙ | X | X | X |

Coumarone-indene resin (manufactured by Nitto Chemical Co., Ltd. Nitto Resin Coumarone H-100, actual measurement value of softening point: 98° C.)
Surfactant (1) sulfate ester ammonium salt of styrenated phenol (weight ratio mono:di:tri = 15:50:35) 8EO adduct
Surfactant (2) sulfate ester ammonium salt of isodecyl alcohol 6EO adduct
Surfactant (3) sulfate ester ammonium salt of isotridecyl alcohol 7EO adduct
Surfactant (4) sulfate ester sodium salt of 2-propyl-1-heptanol 2PO-6EO adduct
Surfactant (5) sodium acetate of lauryl alcohol 3EO adduct
Surfactant (6) disodium sulfosuccinate of lauryl alcohol 3EO adduct
Surfactant (7) styrenated phenol (weight ratio mono:di:tri = 15:50:35) 13EO adduct
Surfactant (8) 2-propyl-1-heptanol 2PO-16EO adduct
Surfactant (9) sodium dodecylbenzenesulfonate
Surfactant (10) sodium dioctyl sulfosuccinate
Surfactant (11) sodium lauryl sulfate
Surfactant (12) disproportionated rosin soap potassium salt
Water-soluble polymer (1) xanthane gum
Water-soluble polymer (2) gum arabic It can be understood from the results shown in Table 1 that it was possible to obtain a coumarone-indene water dispersion which was sill uniform even after elapse of one day after the wet milling and dispersing under a condition of about 30% by weight, of the coumarone-indene resin content by performing the wet milling and dispersing by using the surfactant (Examples 1-1 to 1-13). On the other hand, the resin was separated even immediately after the wet milling and dispersion, and it was not possible to obtain a uniform coumarone-indene water dispersion when the wet milling and dispersing were performed without using the surfactant (Comparative Examples 1-1 to 1-3).

2. Preparation of Coumarone-Indene Resin Water Dispersion (Resin Solid Content: 50%)
(1) Preparation of Dispersant After respective constituents to be blended were poured in accordance with blending prescription shown in Table 2 below, 3 L of each prescribed, liquid in examples and comparative examples was then mixed and stirred. The mixture was dispersed by using a bead mill (manufactured by Shinmaru Enterprises Corporation, horizontal wet dispersing apparatus, Daino-mill, capacity: 1.4 L) under conditions of a solution sending velocity of 750 m L/minute and a disc circumferential velocity of 8 m/second, and a condition that, the horizontal wet type dispersing apparatus was filled with 50% by volume of zirconia beads with a size of 0.5 mm for two hours, and a coumarone-indene resin water dispersion was prepared.

(2) Measurement and Evaluation Methods

Measurement of an average particle size, evaluation on particle size distribution, and evaluation on dispersion stability, compatibility, freezing stability, and transparency after film formation were performed for the obtained water dispersion by the following methods. The results will be shown in Table 2.

[1] Average Particle Size

The average particle size of the coumarone-indene water dispersion immediately after the wet milling and dispersing was measured by a laser diffraction type particle, size distribution measurement apparatus (manufactured by Shimadsu Corporation, product name: SALD-2200). The particle size distribution was evaluated by the following criteria.

S: The particle size distribution is close to normal distribution and sharp.

3: the particle size distribution is not the normal distribution and broad,

[2] Dispersion Stability
(1) Immediately after Dispersing

The dispersion stability was evaluated based on the following criteria by visually observing a state of the water dispersion immediately after the dispersing treatment.

⊙: The dispersion has low viscosity and is uniform,

○: Although the dispersion is uniform, viscosity increases, and the dispersion has become a dispersion with high viscosity.

X: The dispersion has been agglutinated and solidified.

(2) One Week and One Month after Dispersing Treatment

The obtained water dispersion was moved into a transparent container, and a dispersing property of the dispersion in the container was evaluated based on the following criteria by visually observing the states of the dispersion one week after the dispersing treatment and one month after the dispersing treatment.

⊙: Uniform dispersion is obtained.

○: Although surface syneresis is slightly observed, the dispersion is recovered to an original state if the dispersion is shaken.

Δ: The dispersion has been separated into two layers.

X: The dispersion has been agglutinated.

[3] Compatibility

By visually observing a state where 50 g of the coumarone-indene water dispersion immediately after the wet milling and dispersing was mixed with 50 g of an acrylic resin emulsion (manufactured by Chuorikakogyo Co., Ltd., product name: Rikabond AP-80, anionic), compatibility was evaluated by the following criteria.

○: Uniform dispersion is observed.

X: The dispersion has been agglutinated.

[4] Freezing Stability 100 g of the coumarone-indene water dispersion immediately after the wet milling and dispersing was moved into a transparent container, and a freezing stability was evaluated based on the following criteria by visually observing a state after preservation at −5° C. for twenty four hours.

⊙: No difference is observed between the state and a state at a room, temperature.

○: Although the viscosity has increased, the viscosity is recovered to an original viscosity at a room temperature.

Δ: Although fluidity is observed, the viscosity has increased, and the viscosity is not recovered to the original viscosity even at a room temperature.

X: The dispersion has no fluidity and is solidified.

[5] Transparency after Film Formation

The coumarone-indene water dispersion obtained immediately after the wet milling and dispersing was applied by an applicator (manufactured by Taiyu Kizai Co., Ltd.) such that the film thickness after drying was about 120 μm, and the transparency after film formation was evaluated based on the following criteria by visually observing a state after drying the dispersion in a circulating air dryer at 120° C. for five minutes.

○: The coating film is transparent.
X: The coating film is opaque.

TABLE 2

| | | | | | Example 2-1 | Example 2-2 | Example 2-3 | Example 2-4 | Example 2-5 | Example 2-6 | Example 2-7 | Example 2-8 | Example 2-9 | Example 2-10 | Example 2-11 | Example 2-12 | Example 2-13 | Example 2-14 | Example 2-15 | Comparative Example 2-1 |
|---|---|---|---|---|---|---|---|---|---|---|---|---|---|---|---|---|---|---|---|---|
| Coumarone-indene resin (actual measurement value of softening point 110° C.)*1 | | | | | 50 | 50 | 50 | 50 | 50 | 50 | 50 | 50 | 50 | 50 | 0 | 50 | 50 | 50 | 50 | 50 |
| Coumarone-indene resin (actual measurement value of softening point 91° C.)*2 | | | | | 0 | 0 | 0 | 0 | 0 | 0 | 0 | 0 | 0 | 0 | 50 | 0 | 0 | 0 | 0 | 0 |
| Water | | | | | 46.4 | 46.4 | 46.4 | 46.4 | 46.4 | 46.5 | 47.0 | 46.6 | 46.5 | 46.0 | 46.0 | 46.0 | 46.5 | 45.0 | 48.0 | 44.0 |
| Surfactant (a) | $R^1$ | $-(A_1O)_n-$ | X | M | | | | | | | | | | | | | | | | |
| Surfactant (a)-1 | Styrenated phenol residue*3 | $-(EO)_8-$ | $SO_3M$ | $NH_4$ | 2.5 | 2.5 | 2.5 | 2.5 | — | — | — | — | — | — | — | — | — | — | — | — |
| Surfactant (a)-2 | Styrenated phenol residue*3 | $-(EO)_{13}-$ | $SO_3M$ | $NH_4$ | — | — | — | — | 2.5 | 2.5 | — | — | — | — | — | — | 2.5 | — | — | — |
| Surfactant (a)-3 | Isodecyl group | $-(EO)_6-$ | $SO_2M$ | $NH_4$ | — | — | — | — | — | — | 3 | — | — | — | — | — | — | — | — | — |
| Surfactant (a)-4 | 2-propyl-1-heptyl group | $-(PO)_2-(EO)_{15}-$ | $SO_2M$ | Na | — | — | — | — | — | — | — | 2.5 | — | — | — | — | — | — | — | — |
| Surfactant (a)-5 | Disodium sulfosuccinate of lauryl alcohol 3EO adduct*4 | | | | — | — | — | — | — | — | — | — | 2.5 | — | — | — | — | — | — | — |
| Surfactant (b) | $R^2$ | $-(A_2O)_n-$ | | | | | | | | | | | | | | | | | | |
| Surfactant (b)-1 | Styrenated phenol residue*3 | $-(EO)_{13}-$ | | | — | — | — | — | — | — | — | — | — | — | — | — | — | 5.0 | — | — |
| Surfactant (b)-2 | Styrenated phenol residue*3 | $-(EO)_{25}-$ | | | — | — | — | — | — | — | — | — | — | — | — | — | 1.0 | — | — | — |
| Surfactant (b)-3 | Isodecyl group | $-(EO)_{40}-$ | | | 1.0 | — | — | — | — | — | — | — | — | — | — | — | — | — | — | — |
| Surfactant (b)-4 | Isotridecyl group | $-(EO)_{20}-$ | | | — | 1.0 | — | — | — | — | — | — | 1.0 | — | — | — | — | — | — | — |
| Surfactant (b)-5 | 2-propyl-1-heptyl group | $-(PO)_2-(EO)_8-$ | | | — | — | 1.0 | — | — | — | — | — | — | 1.0 | 1.0 | — | — | — | 4.0 | — |
| Surfactant (b)-6 | 2-propyl-1-heptyl group | $-(PO)_2-(EO)_{13}-$ | | | — | — | — | 1.0 | — | — | — | — | — | — | — | 4.0 | — | — | — | — |
| Surfactant (b)-7 | 2-propyl-1-heptyl group | $-(PO)_2-(EO)_{40}-$ | | | — | — | — | — | — | 1.0 | — | 1.0 | — | — | — | — | — | — | — | — |

TABLE 2-continued

| | | Compounding weight ratio | | | | | | | | | | | | | | |
|---|---|---|---|---|---|---|---|---|---|---|---|---|---|---|---|---|
| | | Example 2-1 | Example 2-2 | Example 2-3 | Example 2-4 | Example 2-5 | Example 2-6 | Example 2-7 | Example 2-8 | Example 2-9 | Example 2-10 | Example 2-11 | Example 2-12 | Example 2-13 | Example 2-14 | Example 2-15 | Comparative Example 2-1 |
| Surfactant (b)-8 | 2-propyl-1-heptyl group —(PO)$_2$—(EO)$_{100}$— group | — | — | — | — | 1.0 | — | — | — | — | — | — | — | — | — | — | — |
| Surfactant (c) | | | | | | | | | | | | | | | | | |
| Surfactant (c)-1 | Alkylbenzene sulfonic acid*5 | 0.1 | 0.1 | 0.1 | — | — | — | — | — | — | — | — | — | — | — | — | — |
| Surfactant (c)-2 | Sodium linear secondary sulfonate*6 | — | — | — | 0.1 | 0.1 | — | — | — | — | 0.1 | 0.1 | — | — | — | — | — |
| Water-soluble polymer | | | | | | | | | | | | | | | | | |
| | Xanthene gum | | | | | | | | | | | | | | | | |
| | Average particle size (μm) | 1.1 | 1.1 | 1.2 | 1.2 | 1.5 | 1.3 | 1.3 | 1.2 | 1.3 | 1.2 | 1.3 | 2.9 | 1.1 | 3.7 | 3.2 | 6.0 |
| Particle size distribution | | S | S | S | S | S | S | S | S | S | S | S | B | S | B | B | Not dispersed |
| Dispersing stability | Immediately after | ⊙ | ⊙ | ⊙ | ⊙ | ⊙ | ⊙ | ⊙ | ⊙ | ⊙ | ⊙ | ⊙ | ○ | ○ | ○ | ○ | X |
| | One week later | ⊙ | ⊙ | ⊙ | ⊙ | ⊙ | ⊙ | ⊙ | ⊙ | ⊙ | ⊙ | ⊙ | ○ | ○ | △ | △ | X |
| | One month later | ○ | ○ | ○ | ○ | ○ | ○ | ○ | ○ | ○ | ○ | ○ | X | X | X | X | — |
| Compatibility | | ○ | ○ | ○ | ○ | ○ | ○ | ○ | ○ | ○ | ○ | ○ | ○ | ○ | ○ | ○ | — |
| Freezing stability | | ○ | ○ | ○ | ○ | ○ | ○ | ○ | ○ | ○ | ○ | ○ | ○ | ○ | ○ | ○ | — |
| Transparency after film formation | | ○ | ○ | ○ | ○ | ○ | ○ | ○ | ○ | ○ | ○ | ○ | ○ | ○ | ○ | ○ | — |

*1 Manufactured by Nitto Chemical Co., Ltd., Nitto Resin Coumarone V-120S
*2 Manufactured by Nitto Chemical Co., Ltd., Nitto Resin Coumarone G-90
*3 Weight ratio mono:di:tri = 15:50:35
*4 Manufactured by Daiichi Kogyo Seiyaku Co., Ltd., NEO-HITENOL S-70 (disodium sulfosuccinate of lauryl alcohol 3EO adduct)
*5 Manufactured by Daiichi kogyo Seiyaku Co., Ltd., NEOGEN S20-F (alkylbenzene sulfonic acid, solid content: 20%)
*6 Manufactured by Daiichi Kogyo Seiyaku Co., Ltd., NEOGEN AS-20 (sodium linear secondary sulfonate, solid content 20%)

As shown in Table 2, it was possible to prepare the water dispersion which contains 50% by weight of the coumarone-indene resin by using a predetermined surfactant in Examples 2-1 to 2-15, and a uniform coumarone-indene water dispersion was obtained immediately after completion of the wet milling and dispersing process in any of the examples. The stability in Examples 2-1 to 2-13, in particular, was satisfactory even after elapse of one week after the wet milling and dispersing. Furthermore, the water dispersion in Examples 2-1 to 2-11 maintained the stability even after elapse of one month after the wet milling and dispersing, and it was confirmed that the stability was further enhanced by using a specific surfactant. In addition, compatibility with an acrylic resin emulsion (manufactured by Chuorikakogyo Co., Ltd., product name: Rikabond AP-80, anionic) was satisfactory in any of the examples. On the other hand, it was not possible to obtain a uniform coumarone-indene water dispersion even immediately after the wet milling and dispersing in Comparative Example 2-1 in which the surfactant was not used.

3. Preparation of Coumarone-Indene Resin Water Dispersion (Resin Solid Content: 30% and 50%) Using Cationic Surfactant (1) Preparation of Dispersant 100 mL of each prescribed liquid in examples and comparative examples and reference examples was mixed and stirred in accordance with blending prescription shown in Table 3 below, the same volume of glass beads with a diameter of 1.0 mm were added thereto, Sand Grinder (a name of product manufactured by IMEX Co., Ltd.) was filled with the mixture, and the wet milling and dispersing treatment was performed. After the treatment, the glass beads and the coumarone-indene resin water dispersion were separated by an 30-mesh filter cloth.

(2) Evaluation Method

Measurement of an average particle size and evaluation on dispersion stability and compatibility were performed for the obtained water dispersion by the following methods. The results will be shown in Table 3.

[1] Average Particle Size

The average particle size of the coumarone-indene water dispersion immediately after the wet milling and dispersing was measured by a laser diffraction type particle size distribution measurement apparatus (manufactured by Shimadzu Corporation, product name: SALD-2200).

[2] Dispersion Stability

The obtained water dispersion was moved into a transparent container, and a dispersing property of the dispersion in the container was evaluated based on the following criteria by visually observing a state of the dispersion immediately after the dispersing treatment and one week after the dispersing treatment.

⊙: Uniform dispersion is observed.

○: Although surface syneresis is slightly observed, the dispersion is recovered to an original state if the dispersion is shaken.

Δ: The dispersion has been separated into two layers and is not recovered to the original state even if the dispersion is shaken.

X: The dispersion has been agglutinated.

[3] Compatibility

By visually observing a state where 50 g of the coumarone-indene water dispersion immediately after the wet milling and dispersing was mixed: with 50 g of a fluorine type water repellent agent (TIANJIN DAI-ICHI FINE CHEMICALS Co., Ltd., product name: TUCGUARD CG-2800, cationic), compatibility was evaluated by the following criteria, ○: Uniform, dispersion is observed, X: The dispersion has been agglutinated.

TABLE 3

| | | | | | | | Blending weight ratio | | | | | |
|---|---|---|---|---|---|---|---|---|---|---|---|---|
| Composition | | | | | | | Example 3-1 | Example 3-2 | Example 3-3 | Example 3-4 | Example 3-5 | Example 3-6 |
| Coumarone-indene resin (actual measurement value of softening point: 98° C.)*1 | | | | | | | 30 | 30 | 30 | 30 | 30 | 30 |
| Water | | | | | | | 67 | 67 | 67 | 65 | 66 | 67 |
| Surfactant | | $R^3$ | $R^4$ | $R^5$ | $R^6$ | Y | | | | | | |
| Cationic surfactant 1 | Lauryl group | Methyl group | Methyl group | Methyl group | Cl | | 3 | — | — | — | — | — |
| Cationic surfactant 2 | Cetyl group | Methyl group | Methyl group | Methyl group | Cl | | — | 3 | — | — | — | — |
| Cationic surfactant 3 | Stearyl group | Methyl group | Methyl group | Methyl group | Cl | | — | — | 3 | — | — | — |
| Cationic surfactant 4 | Decyl group | Decyl group | Methyl group | Methyl group | Cl | | — | — | — | 4 | — | — |
| Cationic surfactant 5 | Lauryl group | Benzyl group | Methyl group | Methyl group | Cl | | — | — | — | — | 4 | — |
| Cationic surfactant 6 | Stearyl group | Stearyl group | Methyl group | Methyl group | Cl | | — | — | — | — | — | 3 |
| Cationic surfactant 7 | Stearyl group | Hydroxyethyl group | Methyl group | Methyl group | Cl | | — | — | — | — | — | — |
| Other surfactant | | | | | | | | | | | | |
| 2-propyl-1-heptanol 2PO-40EO adduct | | | | | | | — | — | — | — | — | — |
| Wet milling and dispersing time (hour) | | | | | | | 5 | 5 | 5 | 5 | 5 | 5 |
| Average particle size (μm) | | | | | | | 1.1 | 0.9 | 0.9 | 1.4 | 1.1 | 1.6 |
| Dispersing stability | | | | | Immediately after | | ⊙ | ⊙ | ⊙ | ⊙ | ⊙ | ⊙ |
| | | | | | One week later | | ○ | ○ | ○ | ○ | ○ | ○ |
| | | | | | One month later | | ○ | ○ | ○ | Δ | Δ | Δ |
| Compatibility | | | | | | | ○ | ○ | ○ | ○ | ○ | ○ |

TABLE 3-continued

| Composition | | | | | | Example 3-7 | Example 3-8 | Example 3-9 | Example 3-10 | Example 3-11 |
|---|---|---|---|---|---|---|---|---|---|---|
| Coumarone-indene resin (actual measurement value of softening point: 98° C.)*1 | | | | | | 30 | 30 | 50 | 50 | 50 |
| Water | | | | | | 67 | 67 | 47 | 47 | 47 |
| Surfactant | $R^3$ | $R^4$ | $R^5$ | $R^6$ | Y | | | | | |
| Cationic surfactant 1 | Lauryl group | Methyl group | Methyl group | Methyl group | Cl | — | 2 | 3 | — | — |
| Cationic surfactant 2 | Cetyl group | Methyl group | Methyl group | Methyl group | Cl | — | — | — | 3 | — |
| Cationic surfactant 3 | Stearyl group | Methyl group | Methyl group | Methyl group | Cl | — | — | — | — | 3 |
| Cationic surfactant 4 | Decyl group | Decyl group | Methyl group | Methyl group | Cl | — | — | — | — | — |
| Cationic surfactant 5 | Lauryl group | Benzyl group | Methyl group | Methyl group | Cl | — | — | — | — | — |
| Cationic surfactant 6 | Stearyl group | Stearyl group | Methyl group | Methyl group | Cl | — | — | — | — | — |
| Cationic surfactant 7 | Stearyl group | Hydroxyethyl group | Methyl group | Methyl group | Cl | 3 | — | — | — | — |
| Other surfactant | | | | | | | | | | |
| 2-propyl-1-heptanol 2PO-40EO adduct | | | | | | — | 1 | — | — | — |
| Wet milling and dispersing time (hour) | | | | | | 5 | 5 | 5 | 5 | 5 |
| Average particle size (μm) | | | | | | 1.2 | 1.0 | 1.0 | 0.9 | 0.8 |
| Dispersing stability | | | | | Immediately after | ⊙ | ⊙ | ⊙ | ⊙ | ⊙ |
| | | | | | One week later | ○ | ⊙ | ○ | ○ | ○ |
| | | | | | One month later | Δ | ⊙ | ○ | ○ | ○ |
| Compatibility | | | | | | ○ | ○ | ○ | ○ | ○ |

*1 Manufactured by Nitto Chemical Co., Ltd., Nitto Resin, Coumarone G-100N

As shown in Table 3, it was possible to prepare the coumarone-indene resin water dispersion by using a predetermined cationic surfactant in Examples 3-1 to 3-11, and it was possible to confirm that the stability of the coumarone-indene water dispersion in Examples 3-1 to 3-3 and 3-8 to 3-11, in particular, was satisfactory even after elapse of one month after the wet milling and dispersing. In addition, it was possible to confirm that compatibility with the cationic fluorine type water repellent agent (TIANJIN DAI-ICHI FINE CHEMICALS Co., Ltd., product name: TUCGUARD CG-2800) was satisfactory.

INDUSTRIAL APPLICABILITY

The coumarone-indene resin water-dispersed composition according to the present invention has excellent dispersing properties such as mechanical stability, chemical stability, preservation stability, freezing stability, and blending stability, and can be preferably applied to an adhesive agent base, a tackifier, a paint additive, a binder resin, a resin modifier, a surface modifier, a size property applicator, a hydrophobizing agent, an extender, and the like in various products and in fields of usage such as various adhesive agents, an adhesive tape, a paint, tire and rubber products, a resin for printing and ink, paper, fiber, a carpet, and a road paver since the composition can exhibit, a satisfactory sticky and adhesive property, water resistance, a surface protective property, high heat resistance, high compatibility, and a resin improving property.

The invention claimed is:

1. A method for manufacturing a coumarone-indene resin water-dispersed composition, the method comprising:
a process of dispersing a coumarone-indene resin which contains 50% by weight or more of coumarone and indene in total as monomer constituents and has a softening point of 60° C. or more, in the presence of a surfactant by a wet milling and dispersing method,
wherein a surfactant (a) which is represented by Formula (I) and a surfactant (b) which is represented by Formula (II) are used as the surfactant:

$$\text{Surfactant } (a): R^1\text{—O-}(A^1O)_p\text{—X} \quad (I)$$

$$\text{Surfactant } (b): R^2\text{—O-}(A^2O)_q\text{—H} \quad (II)$$

where in Formula (I), $R^1$ represents one or more selected from a group consisting of an alkyl group having eight to twenty-two carbons, an alkenyl group having eight to twenty-two carbons, and an aromatic derivative residue represented by any of Formulae (III) to (V), $A^1O$ represents an oxyalkylene group having two to four carbons, p represents an average addition mole number of an alkylene oxide, which is a number from zero to thirty, and X represents an anionic group which is represented by any of Formulae (VI) to (VIII), wherein M in Formulae (VI) to (VIII) represents any one of a hydrogen atom, an alkali metal atom, ammonium, and an alkanolamine, and Formula (II), $R^2$ represents one or more selected from a group consisting of an alkyl group having eight to fifteen carbons, an alkenyl group having eight to fifteen carbons, and aromatic derivative residue which is represented by any of Formulae (III) to (V), $A^2O$ represents an oxyalkylene group having two to four carbons, and q represents an average addition mole number of an alkylene oxide, which is a number from 0 to 200

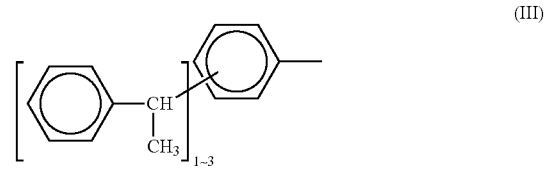
(III)

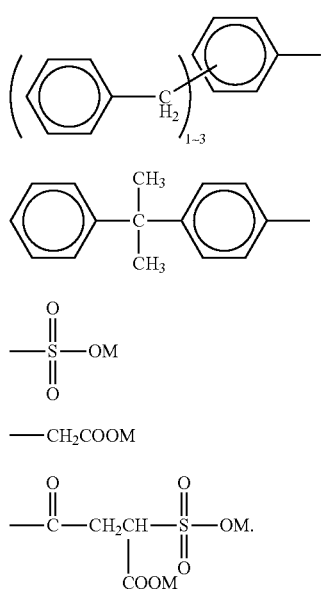 (IV)

(V)

(VI)

(VII)

(VIII)

2. A method for manufacturing a coumarone-indene resin water-dispersed composition, the method comprising:

a process of dispersing a coumarone-indene resin which contains 50% by weight or more of coumarone and indene in total as monomer constituents and has a softening point of 60° C. or more, in the presence of a surfactant by a wet milling and dispersing method, wherein a cationic surfactant which is represented by Formula (IX) is used as the surfactant:

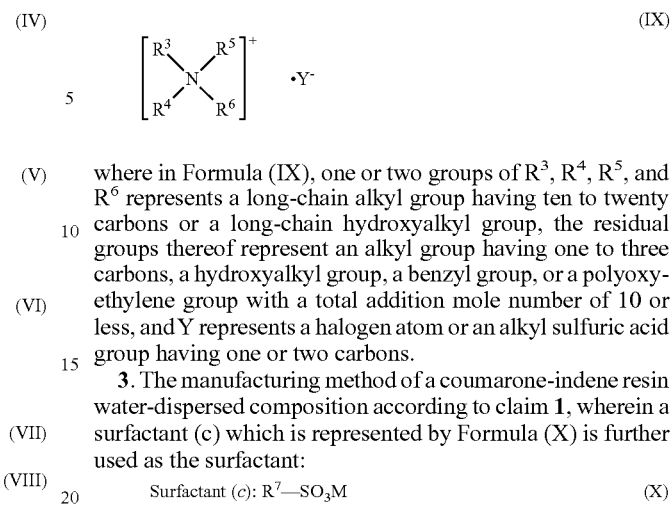 (IX)

where in Formula (IX), one or two groups of $R^3$, $R^4$, $R^5$, and $R^6$ represents a long-chain alkyl group having ten to twenty carbons or a long-chain hydroxyalkyl group, the residual groups thereof represent an alkyl group having one to three carbons, a hydroxyalkyl group, a benzyl group, or a polyoxyethylene group with a total addition mole number of 10 or less, and Y represents a halogen atom or an alkyl sulfuric acid group having one or two carbons.

3. The manufacturing method of a coumarone-indene resin water-dispersed composition according to claim 1, wherein a surfactant (c) which is represented by Formula (X) is further used as the surfactant:

Surfactant (c): $R^7$—$SO_3M$ (X)

where in Formula (X), $R^7$ represents one or more selected from a group consisting of a primary or secondary alkyl group having ten to fifteen carbons, a primary or secondary alkenyl group having ten to fifteen carbons, a primary or secondary hydroxyalkyl group having ten to eighteen carbons, an alkyl benzene residue, and a dialkyl succinate residue, and M represents a hydrogen atom, an alkali metal atom, ammonium, or an alkanolamine.

4. A coumarone-indene resin water-dispersed composition which is obtained by the manufacturing method of claim 1.

5. A coumarone-indene resin water-dispersed composition which is obtained by the manufacturing method of claim 2.

6. A coumarone-indene resin water-dispersed composition which is obtained by the manufacturing method of claim 3.

* * * * *